US009547862B2

(12) United States Patent
Akin (10) Patent No.: US 9,547,862 B2
(45) Date of Patent: Jan. 17, 2017

(54) ELECTRONIC PAYMENT RESTRICTION (75) Inventor: Jeremiah Joseph Akin, Austin, TX (US)

(73) Assignee: PayPal, Inc., San Jose, CA (US)

( * ) Notice: Subject to any disclaimer, the term of this patent is extended or adjusted under 35 U.S.C. 154(b) by 1008 days.

(21) Appl. No.: 13/564,044

(22) Filed: Aug. 1, 2012

(65) Prior Publication Data

US 2014/0040129 A1    Feb. 6, 2014

(51) Int. Cl.
G06Q 40/00        (2012.01)
G06Q 30/00        (2012.01)
G06Q 20/40        (2012.01)
G06Q 50/00        (2012.01)

(52) U.S. Cl.
CPC .......... G06Q 20/4037 (2013.01); G06Q 50/01 (2013.01)

(58) Field of Classification Search
CPC ........ G06Q 50/01; G06Q 10/10; G06Q 40/00; G06Q 20/02; G06Q 20/04; G06Q 20/10; H04L 51/32
USPC ........ 705/1.1, 319, 26.1, 35, 36 R, 44, 7.15, 39,705/41; 726/26; 235/379, 380
See application file for complete search history.

(56) References Cited

U.S. PATENT DOCUMENTS

| | | | | |
|---|---|---|---|---|
| 5,566,327 A * | 10/1996 | Sehr | ..................... | G06Q 20/341 |
| 8,127,982 B1 * | 3/2012 | Casey | ............. | G06Q 20/35785 |
| | | | | 235/379 |
| 8,249,626 B2 * | 8/2012 | Huston | ................... | G01S 19/14 |
| | | | | 455/404.2 |
| 8,459,544 B2 * | 6/2013 | Casey | ............. | G06Q 20/35785 |
| | | | | 235/379 |
| 8,700,466 B2 * | 4/2014 | Broadhead | ............. | H04L 67/42 |
| | | | | 705/14.4 |
| 8,892,551 B2 * | 11/2014 | Oikonomou | ........ | G06F 17/3087 |
| | | | | 707/728 |
| 8,918,840 B2 * | 12/2014 | Dean | ....................... | G06F 21/62 |
| | | | | 726/3 |
| 2007/0239507 A1 * | 10/2007 | Madhogarhia | ......... | G06Q 10/10 |
| | | | | 705/80 |
| 2008/0172407 A1 * | 7/2008 | Sacks | ..................... | G06Q 10/10 |
| 2009/0183226 A1 * | 7/2009 | Dean | ....................... | G06F 21/62 |
| | | | | 726/1 |
| 2009/0327135 A1 * | 12/2009 | Nguyen | ................. | G06Q 40/02 |
| | | | | 705/44 |
| 2012/0096352 A1 * | 4/2012 | Maor | ..................... | H04L 51/32 |
| | | | | 715/706 |

(Continued)

OTHER PUBLICATIONS

Katz, Ian "Technology Prevents Parents From Losing Kids At Sunrise, Fla., Amusement Park" Nov. 25, 2004, Knight Ridder Tribune Business News, 1.*

(Continued)

*Primary Examiner* — Kelly Campen
(74) *Attorney, Agent, or Firm* — Haynes and Boone, LLP (57) ABSTRACT

Methods and systems are provided for facilitating control of a child's purchasing of products from a merchant using a credit card, debit card, gift card, secure token, mobile device, or the like. A payment provider, such as Paypal, Inc., can authorized the purchase of a product from the merchant if both the child and the parent are checked in with the same merchant via one or more social networks (thereby indicating that the child and the parent are in or near the same store). This requirement for proximity between the child and the parent can provide the parent with an opportunity to more closely monitor purchases made by the child.

21 Claims, 4 Drawing Sheets

(56) References Cited

U.S. PATENT DOCUMENTS

| | | | |
|---|---|---|---|
| 2013/0018792 A1* | 1/2013 | Casey | G06Q 20/35785 705/44 |
| 2013/0091208 A1* | 4/2013 | Rajakarunanayake | H04W 4/206 709/204 |
| 2013/0124328 A1* | 5/2013 | Broadhead | H04L 67/42 705/14.66 |
| 2013/0217363 A1* | 8/2013 | Myers | G06Q 50/01 455/414.1 |
| 2013/0254296 A1* | 9/2013 | Lai | H04L 65/40 709/205 |
| 2013/0346518 A1* | 12/2013 | Soundararajan | G06Q 10/06 709/206 |
| 2014/0019544 A1* | 1/2014 | Palmert | G06F 15/17306 709/204 |
| 2014/0040129 A1* | 2/2014 | Akin; Jeremiah Joseph | G06Q 20/4037 705/44 |
| 2014/0101149 A1* | 4/2014 | Winters | G06F 17/30345 707/736 |
| 2014/0234816 A1* | 8/2014 | Lokuge | G09B 19/00 434/236 |
| 2014/0253314 A1* | 9/2014 | Rambadt | B60N 2/002 340/457.1 |
| 2014/0338001 A1* | 11/2014 | Zhang | G06F 21/6218 726/28 |

OTHER PUBLICATIONS

Smith, Andrew D. "New Tools Help Parents Keep Tabs on Kids" Jun. 4, 2008, McClatchy—Tribune Business News.*

Thom, Greg "Parents Play Big Brother" Jul. 31, 2011, The Sunday Times, 37.*

* cited by examiner

ELECTRONIC PAYMENT RESTRICTION

BACKGROUND

Technical Field

The present disclosure generally relates to electronic commerce and, more particularly, relates to a method and system for use by parents to restrict purchases made by children, for example.

Related Art

Electronic payment for products purchased at brick and mortar stores is common. Such electronic payment can be made using cards, such as credit cards, debit cards, and gift cards, for example. Such electronic payment can be made using security tokens, such as software security tokens and hardware security tokens, for example. Whether the electronic payment is made by card, security token, or another means, a payment provider, such as Paypal, Inc., can facilitate the payment.

The payment provider can facilitate authentication of the purchaser, determine if the purchaser is authorized to make the purchase (can determine that the purchaser has not exceeded a deposited amount, e.g., for a debit card or gift card, or has not exceeded a credit limit, for example), and can facilitate the transfer of money from the purchaser to a merchant so as to pay the merchant for the purchased product. The payment provider can pay the merchant with money previously deposited with the payment provider by the purchaser, can transfer money from a bank account of the purchaser, or can bill the purchaser for the amount of the purchase.

Location-aware social networks such as Foursquare and Google Latitude provide apps for mobile devices like cellular telephones. By using such an app, a social network member can check in at a location. Checking in at a location allows other, selected, members of the social network to view the location of the member.

DETAILED DESCRIPTION

Methods and systems are provided for facilitating control by a parent of a child's purchasing of products from a merchant using a credit card, debit card, gift card, security token, mobile device, or the like. According to an embodiment, a payment provider, such as Paypal, Inc., can authorize the purchase of a product from the merchant if both the child and the parent are checked in with the same merchant via a social network. Thus, the child can only make purchases when the parent is present. This requirement for proximity between the child and the parent can provide the parent with an opportunity to more closely monitor purchases made by the child. The methods and systems can be used for mobile payments and non-mobile payments.

The parent can be any person who has authority and/or capacity to make at least some decisions regarding another person, e.g., the child. For example, the parent can be an adult, a biological parent, a foster parent, a guardian, a custodian, an employer, or a supervisor.

The child can be any person who lacks authority and/or capacity to make at least some decisions regarding their self. For example, the child can be a minor, a biological child of the parent, a foster child of the parent, a person who has a guardian, a person who has a custodian, an employee, or someone who has a supervisor.

Figure 1:
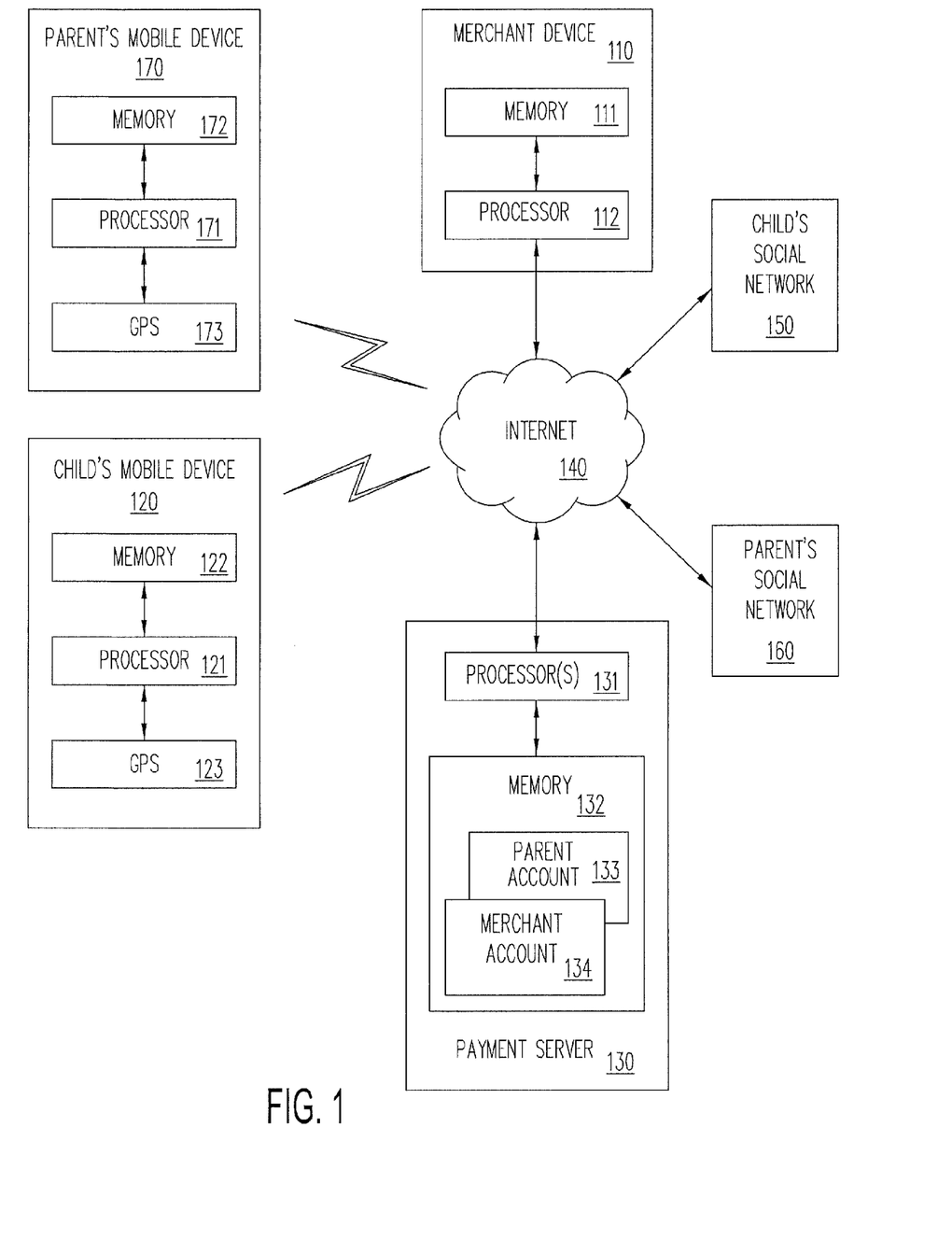
FIG. 1 is a block diagram of a system for electronic payment restriction, according to an embodiment.

FIG. 1 is a block diagram of a system for electronic payment restriction, in accordance with an embodiment. The system can include a merchant device 110. The merchant device 110 can be a merchant checkout terminal, a computer, and/or a server, for example. The merchant device 110 can include a memory 111 and one or more processors 112.

The system can include a child's mobile device 120. The child's mobile device 120 can be carried by the child. The child's mobile device 120 can be a cellular telephone, a smart telephone, a hand held computer, a laptop computer, a notebook computer, or a tablet computer, for example. The child's mobile device 120 can include a processor 121, a memory 122, and a global positioning system (GPS) 123.

Similarly, the system can include a parent's mobile device 170. The parent's mobile device 170 can be carried by the parent. The parent's mobile device 170 can be a cellular telephone, a smart telephone, a hand held computer, a laptop computer, a notebook computer, or a tablet computer, for example. The parent's mobile device 170 can include a processor 171, a memory 172, and a global positioning system (GPS) 173.

The child's mobile device 120 and/or the parent's mobile device 170 can be a near field communications (NFC) enabled mobile device. The child's mobile device 120 and/or the parent's mobile device 170 can communicate with the merchant device 110 via near field communications (NFC). The child's mobile device 120 and/or the parent's mobile device 170 can communicate (such as with one another, the merchant device 110, a child's social network 150, a parent's social network 160, and/or a payment server 130) via any desired network or means. For example, the child's mobile device 120 and/or the parent's mobile device 170 can communicate via WiFi, WiMax, Bluetooth, a local area network (LAN), a wide area network (WAN), and/or the Internet.

The system can include the payment server 130. The payment server 130 can be a server of a payment provider, such as Paypal, Inc. The payment server 130 can be a single server or can be a plurality of servers. The payment server 130 can include one or more processors 131 and a memory 132. The memory 132 can be a memory of the payment server 130 or a memory that is associated with the payment server 130. The memory 132 can be a distributed memory. The memory 132 can store a parent account 133 and a merchant account 134. The parent account 133 can be an account of the parent of the child. The child can have a payment provider account or subaccount (such as a subaccount of the parent account). The parent and/or the child can be users of the payment provider.

The system can include the child's social network 150. The child's social network 150 can be a location-aware child's social network 150. Thus, the child's social network 150 can, at least to some degree, monitor or be aware of the location of a member, e.g., the child. For example, the child can check in at a location (such as via an app of the child's mobile device 120 or via an app of the parent's mobile device 170, wherein the app uses a location provided by the GPS 123, 173) or the child or the child's mobile device 120 can otherwise inform the child's social network 150 of the member's location. Foursquare and Google latitude are examples of location-aware social networks.

The system can include the parent's social network 160. The parent's social network 160 can be a location-aware parent's social network 160. Thus, the parent's social network 160 can, at least to some degree, monitor or be aware of the location of a member, e.g., the parent. For example, the parent can check in at a location (such as via an app of the parent's mobile device 170 or via an app of the child's mobile device 120, wherein the app uses a location provided by the GPS 173, 123) or the parent or the parent's mobile device 170 can otherwise inform the parent's social network 160 of the member's location.

The location of the child and/or the location of the parent can be provided, such as to the processor 131, via means other than a social network, e.g., the child's social network 150 and/or the parent's social network 160. For example, the payment server 130 can obtain the location of the child and/or the location of the parent from the GPS 123 of the child's mobile device 120 and/or the GPS 173 of the parent's mobile device 170.

The child's mobile device 120 and/or the parent's mobile device 170 can report the location of the child and/or the parent, such as to the payment server 130. The child's mobile device 120 and/or the parent's mobile device 170 can report the location of the child and/or the parent to any other device, computer, or server. For example, the child's mobile device 120 and/or the parent's mobile device 170 can report the location of the child and/or the parent to a location monitoring server that monitors the location of mobile devices (and thus monitors the location of people, vehicles, or other items). The location monitoring server can report the locations of the child and/or the parent to the payment server 130. Alternatively, the payment server 130 can query the location monitoring server regarding the location of the child and/or the parent. For example, the payment server 130 can query the location monitoring server regarding the location of the child and/or the parent in response to the child initiating a purchase transaction.

As a further example, the payment server 130 can obtain the location of the child and/or the parent from the merchant device 110. The payment server 130 can obtain the location of the parent from the merchant device 110 when the parent checks out, e.g., makes a purchase from the merchant. The payment server 130 can obtain the location of the child from the merchant device 110 when the child checks out, e.g., makes a purchase from the merchant.

The parent and/or the child can enter their location manually. For example, the child can enter the child's location by typing the child's location into the child's mobile device 120 and/or the parent can enter the parent's location by typing the parent's location into the parent's mobile device 170. As a further example, the child can enter the child's location by selecting the child's location from a map presented by the child's mobile device 120 or the parent can enter the parent's location by selecting the parent's location from a map presented by the parent's mobile device 120.

According to an embodiment, the parent can enter the parent's location manually and the child cannot enter the child's location manually. The parent can enter the child's location manually. Thus, the parent can be better assured that the child's location has been entered accurately.

The merchant device 110, the child's mobile device 120, the parent's mobile device 170, and the payment server 130 can communicate with one another via a network, such as the Internet 140. The merchant device 110, the child's mobile device 120, the parent's mobile device 170, and the payment server 130 can communicate with one another via a plurality of networks, such as local area networks (LANs), wide area networks (WANs), cellular telephone networks, and the like.

Figure 2:
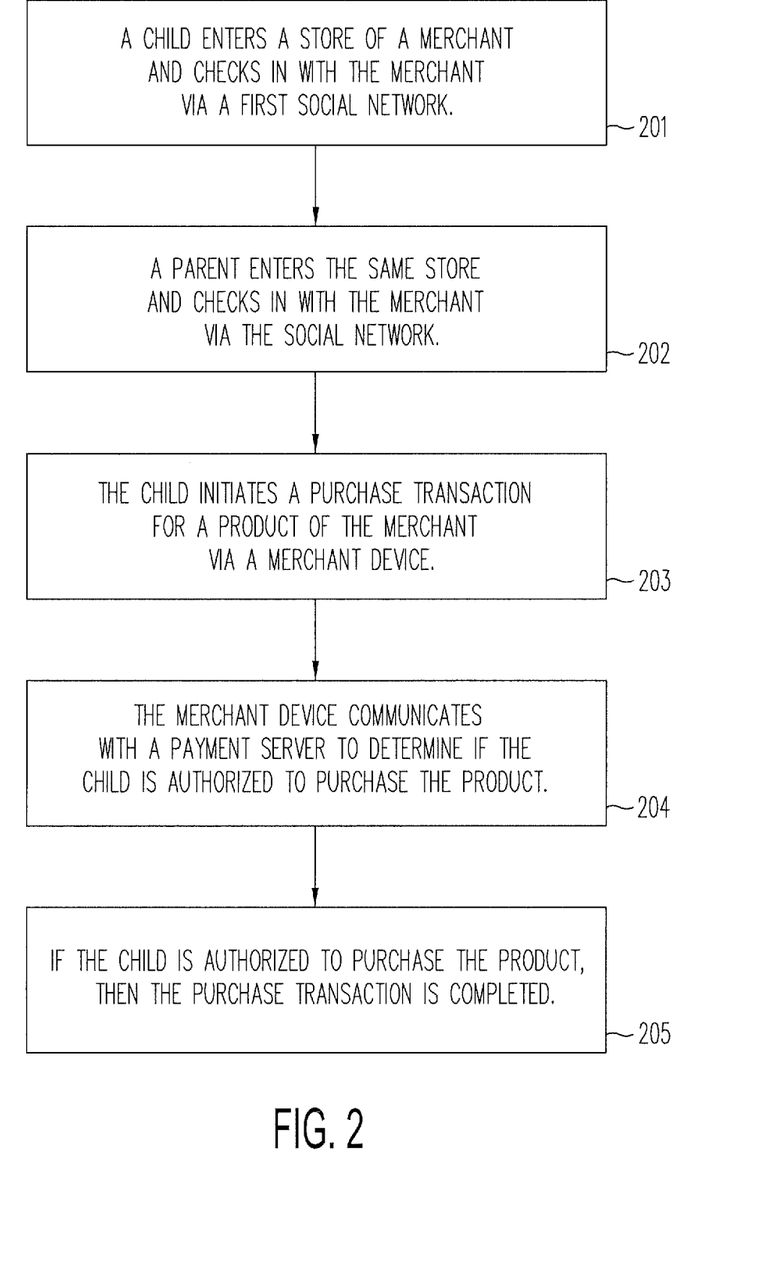
FIG. 2 is a flow chart showing a method for electronic payment restriction, according to an embodiment.
Figure 3:
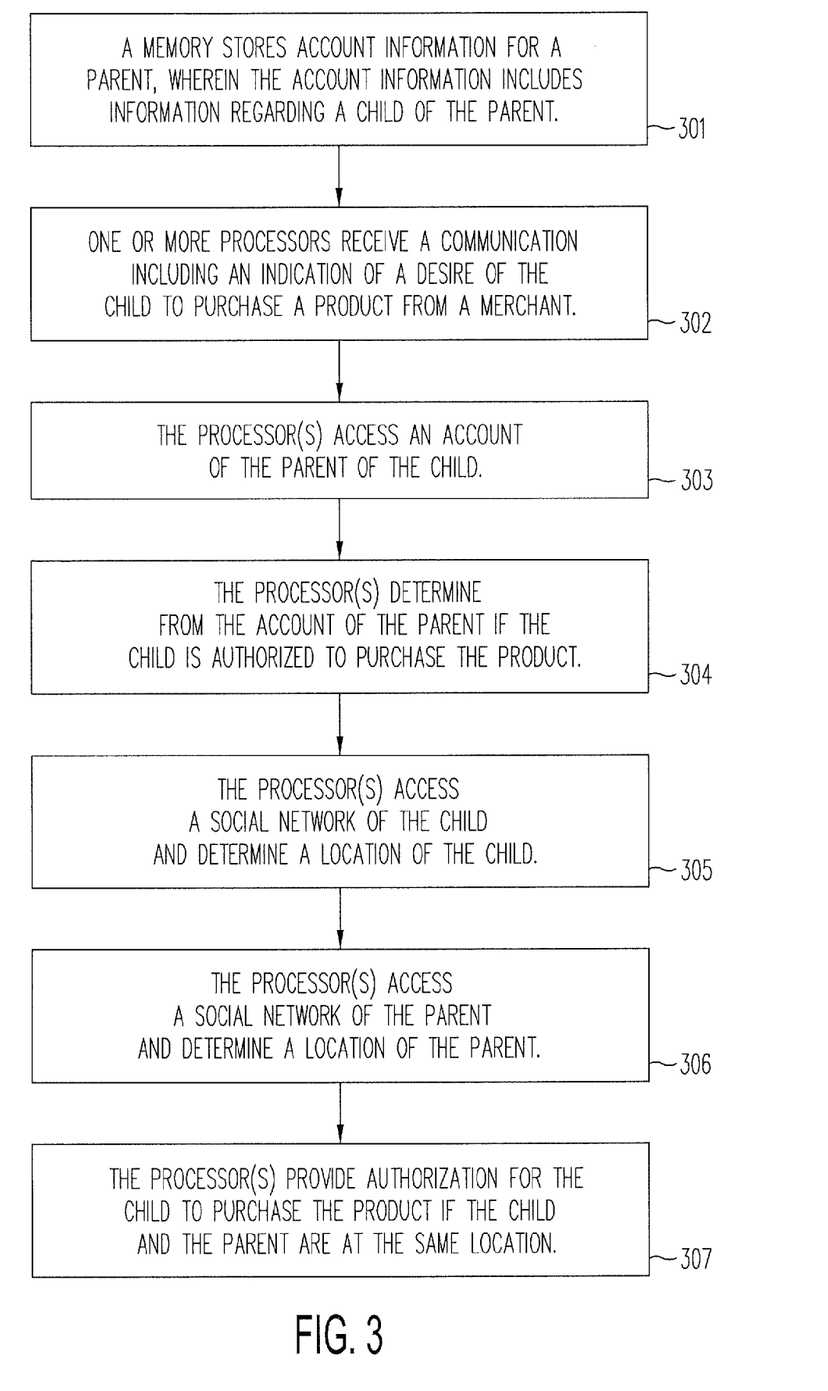
FIG. 3 is a flow chart showing further detail of the method for electronic payment restriction, according to an embodiment.

FIGS. 2 and 3 are flow charts that describe examples of operation of the electronic payment restriction system, according to embodiments thereof. Note that one or more of the steps described herein may be combined, omitted, or performed in a different order as desired or appropriate.

FIG. 2 is a flow chart showing a method for electronic payment restriction, according to an embodiment. A child can enter a store of a merchant and can check in with the merchant via the child's social network 150, as shown in step 201. Similarly, a parent of the child can enter the same store and can check in with the same merchant via a parent's social network 160, as shown in step 202. The child's social network 150 and the parent's social network 160 can be the same social network. The child's social network 150 and the parent's social network 160 can be different social networks.

The child's social network 150 can be a location-aware social network. Similarly, the parent's social network 160 can be a location-aware social network. Thus, when the child or the parent checks in with their respective social network 150 or 160, the child's social network 150 can obtain the location of the child or parent's social network 160 can obtain the location of the parent. For example, the child's social network 150 can obtain the location of the child via the GPS 123 of the child's mobile device 120 and the parent's social network 160 can obtain the location of the parent via the GPS 173 of the parent's mobile device 170.

The child can initiate a purchase transaction for a product of the merchant, such as via the merchant device 110, as shown in step 203. For example, the child can begin checkout with the merchant and can swipe a card, enter a code, e.g., personal identification number (PIN) using a card reader or a keypad of the merchant device 110.

The child can initiate the purchase transaction via the child's mobile device 120. For example, the child can initiate the purchase transaction by starting an app on the child's mobile device 120 that facilitates mobile payment for the purchase via the child's mobile device 120.

The merchant device 110 can communicate with the payment server 130 to determine whether or not the child is authorized to purchase the product, as shown in step 204. In order to determine whether or not the child is authorized to purchase the product, the payment server 130 can access the parent account 133 with which the child is associated.

The payment server 130 can verify that the child is authorized make the purchase by determining that the purchase will not cause an account balance limit (such as for a debit card or a gift card) or a credit limit (such as for a credit card) to be exceeded, for example. The payment server 130 can further verify that the child is authorized make the purchase by determining that the purchase is for an item that the child is authorized to purchase and/or is not for an item that the child is not authorized to purchase. For example, the child can be authorized to purchase clothing and can be not authorized to purchase food items or video games.

Items that the child is authorized to purchase and/or items that the child is not authorized to purchase can be provided to the payment server 130 during a setup process. For example, these items can be listed or selected when the parent is setting up the payment provider account for the child, e.g., when the parent is adding the child to the parent's payment provider account. The parent can be presented with a list of proposed items by the payment server 130 and the parent can select those items from the list which the child is to be authorized to purchase and/or can select from the list those items which the child is not to be authorized to purchase. Authorized or unauthorized purchases can also be updated after account set-up in various ways. For example, the parent can revise settings by accessing the account through the payment provider or the settings may be revised when the parent approves or denies a purchase request from the child. The child may be attempting to purchase an item not on an approved list, but the parent may approve and be asked whether the item or type of item (or other parameters associated with the purchase request) should be added as an approved item or type for future purchase requests.

Items which the child is authorized to purchase and items which the child is not authorized to purchase can depend upon various factors. For example, items which the child is authorized to purchase and items which the child is not authorized to purchase can depend upon the age of the child, the day of the week, the month, or any other factor. The parent can enter the age of the child and the payment serve 130 can present the parent with a list of items that are appropriate for purchase by a child of the entered age. The parent can then modify the list, if desired. Similarly, the payment serve 130 can present the parent with a list of items that are not appropriate for purchase by a child of the entered age. Again, the parent can then modify the list, if desired. The parent can define one or more different lists of items which the child is authorized to purchase and the parent can define one or more different lists of items which the child is not authorized to purchase for each one of a plurality of different children. The different lists can be used at different times or under different conditions, as discussed herein.

An amount associated with purchases made by the child can be limited by the parent. For example, the number of purchases, the dollar amount of each purchase, and/or a total dollar amount for purchases (such as for all purchases made in a given time period, such as a day, a week, a month, or a year) can be limited by the parent, such as during the set up process. Such limits can vary depending upon any desired factors. For example, the total dollar amount for purchases made within a day can be increased on weekends, holidays, during summer (non-school) months, and on the child's birthday. The limits can vary in any desired manner. For example, the limits can increase over time (such as at a uniform rate over time or in a stair-step fashion, such as on each birthday of the child).

Exceptions to the limits can be made. For example, the child can request an exception to a limit for a particular purchase. The desire for the exception to the limit can be communicated to the parent and the parent can then either accept or decline the exception.

The desire for the exception to the limit can be communicated to the parent automatically when the child attempts to exceed the limit. The desire for the exception to the limit can be communicated to the parent in advance with respect to the purchase and the exception can be pre-authorized by the parent.

If the child is authorized to purchase the product, then the purchase transaction is completed, as shown in step 205. The child can be authorized to purchase the product by the payment server 130 if the child and the parent are in the same store or are otherwise proximate one another, as discussed herein. Completing the transaction can include the child receiving the product purchased, receiving a receipt for the product purchased, and leaving the store.

FIG. 3 is a flow chart showing further detail of the method for electronic payment restriction, according to an embodiment. A memory 132 can store account information for a parent, wherein the account information can include information regarding a child of the parent, as shown in step 301. One or more processors 131 can receive a communication including an indication of a desire of the child to purchase a product from a merchant, as shown in step 302. The processor(s) 131 can access an account of the parent of the child (such as the parent account 133), as shown in step 303. The processor(s) 131 can determine from the parent account 133 if the child is authorized to purchase the product, as shown in step 304. The processor(s) 131 can access the child's social network 150 and can thereby determine a location of the child, as shown in step 305. The processor(s) 131 can access a parent's social network 160 and can thereby determine a location of the parent, as shown in step 306. The processor(s) 131 can provide authorization for the child to purchase the product if the child and the parent are at the same location, e.g., in the same store, as shown in step 307.

Determining the location of the child can comprise determining if the child has checked in with the merchant on the child's social network 150. Determining the location of the parent can comprise determining if the parent has checked in with the merchant on the parent's social network 160. The child and the parent can be determined to be at the same location if the child and the parent are checked in at the same store with the child's social network 150 and the parent's social network 160.

The child and the parent can be determined to be at the same location if the child and the parent are proximate one another. The child and the parent can be determined to be proximate one another if the child and the parent are within a predetermined distance from one another. For example, the child and the parent can be determined to be proximate one another if the child and the parent are within 50 feet, 100 feet, 200 feet, 300 feet or more of one another. The distance can be specified by the parent, such as during a set up process.

The check in times for the child and the parent can be required to be within a predetermined time with respect to one another. For example, the check in times can be required to be within 5 minutes, 10 minutes, 20 minutes, 30 minutes, or more of one another.

The child and the parent can be determined to be at the same location if the child and the parent are checked in with two different merchants that are near to one another. For example, the child and the parent can be determined to be at the same location if the child and the parent are checked in with merchants that are next to one another. As a further example, the child and the parent can be determined to be at the same location if the child and the parent are checked in with merchants that are within 50 feet, 100 feet, 200 feet, 300 feet or more of one another.

According to an embodiment, the electronic payment restriction method and system can be used by the parent to control purchases made by the child regardless of the location of the parent and the child. For example, the child can check in with a merchant, such as via the child's social network, and any desired restrictions or limitations can be place upon purchases made by the child from the merchant. The limitations can be predefined and applied by the payment server 130. The limitations can be defined in real time and applied by the parent, any other person, or a machine.

The limitations can be either predefined or not predefined. The limitations can be applied regardless of the proximity of the parent to the child. Thus, the parent can control purchases made by the child regardless of the proximity of the parent to the child.

Any desired combination of proximity based limitations and non-proximity based limitation can be used. For example, one set of limitations can be used to control purchases of the child when the parent is proximate, e.g., in the same store, as the child and another, different, set of limitations can be used to control purchases of the child when the parent is not proximate the child.

The limitations can be modified in real time. The parent can change the limitations at any desired time. For example, the parent can change a particular limitation in response to a request to do so from the child.

Approval of the parent for the child to purchase the product can be requested by the child if the child and the parent are not at the same location (and thus the payment server 130 does not automatically approve the purchase transaction). Approval of the parent for the child to purchase the product can be requested by the child if the purchase transaction is not automatically approved by the payment server 130 because the purchase exceeds a predefined limit, as discussed herein.

According to an embodiment, the parent can receive notification of the purchase or pending purchase. The parent can receive the notification via text messaging, email, voice, or any other method. Thus, the parent can have an opportunity to monitor the purchase promptly.

According to an embodiment, a method can comprise storing, in a memory 132, account information for a parent, the account information including information regarding a child of the parent. The method can further comprise receiving, electronically by one or more processors 131, a communication including an indication of a desire of the child to purchase a product from a merchant. The method can further comprise accessing, by the processor(s) 131, an account of the parent of the child, e.g., the parent account 133. The method can further comprise determining, by the processor(s) 131, from the account of the parent whether or not the child is authorized to purchase the product. The method can further comprise accessing, by the processor(s) 131, a child's social network 150 and determining a location of the child. The method can further comprise accessing, by the processor(s) 131, a parent's social network 160 and determining a location of the parent. The method can further comprise providing, by the processors 131, authorization for the child to purchase the product if the child and the parent are at the same location.

According to an embodiment, a computer program product can comprise a non-transitory computer readable medium that can have computer readable and executable code. The computer readable and executable code can instruct the processor(s) 131 to perform the method.

According to an embodiment, geofencing can be used to define a boundary within which the child and/or the parent must be for the child to make a purchase. That is, a geographic boundary can be used to determine where purchases can be made by the child. The boundary can be defined by a store, a group of stores, a mall, a shopping area, a theme park, a city, a town, or any other area or geographic location. The area can be defined upon a map. The area can be selected upon the map or drawn, such as electronically with a touch screen, upon the map. The child can be required to be within the boundary in order for the child to make a purchase. Both the child and the parent can be required to be within the same boundary or within different boundaries in order for the child to make a purchase. For example, a family can take a trip to Disneyland and the parent can allow the child to spend up to $50 anywhere within Disneyland. Thus, the parent does not have to approve every shop in Disneyland for purchases made by the child. Instead, the parent can approve limited amounts based on boundaries.

In implementation of the various embodiments, embodiments of the invention may comprise a personal computing device, such as a personal computer, laptop, PDA, cellular phone or other personal computing or communication devices. The payment provider system may comprise a network computing device, such as a server or a plurality of servers, computers, or processors, combined to define a computer system or network to provide the payment services provided by a payment provider system.

In this regard, a computer system may include a bus or other communication mechanism for communicating information, which interconnects subsystems and components, such as a processing component (e.g., processor, microcontroller, digital signal processor (DSP), etc.), a system memory component (e.g., RAM), a static storage component (e.g., ROM), a disk drive component (e.g., magnetic or optical), a network interface component (e.g., modem or Ethernet card), a display component (e.g., CRT or LCD), an input component (e.g., keyboard or keypad), and/or cursor control component (e.g., mouse or trackball). In one embodiment, a disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the invention.

Figure 4:
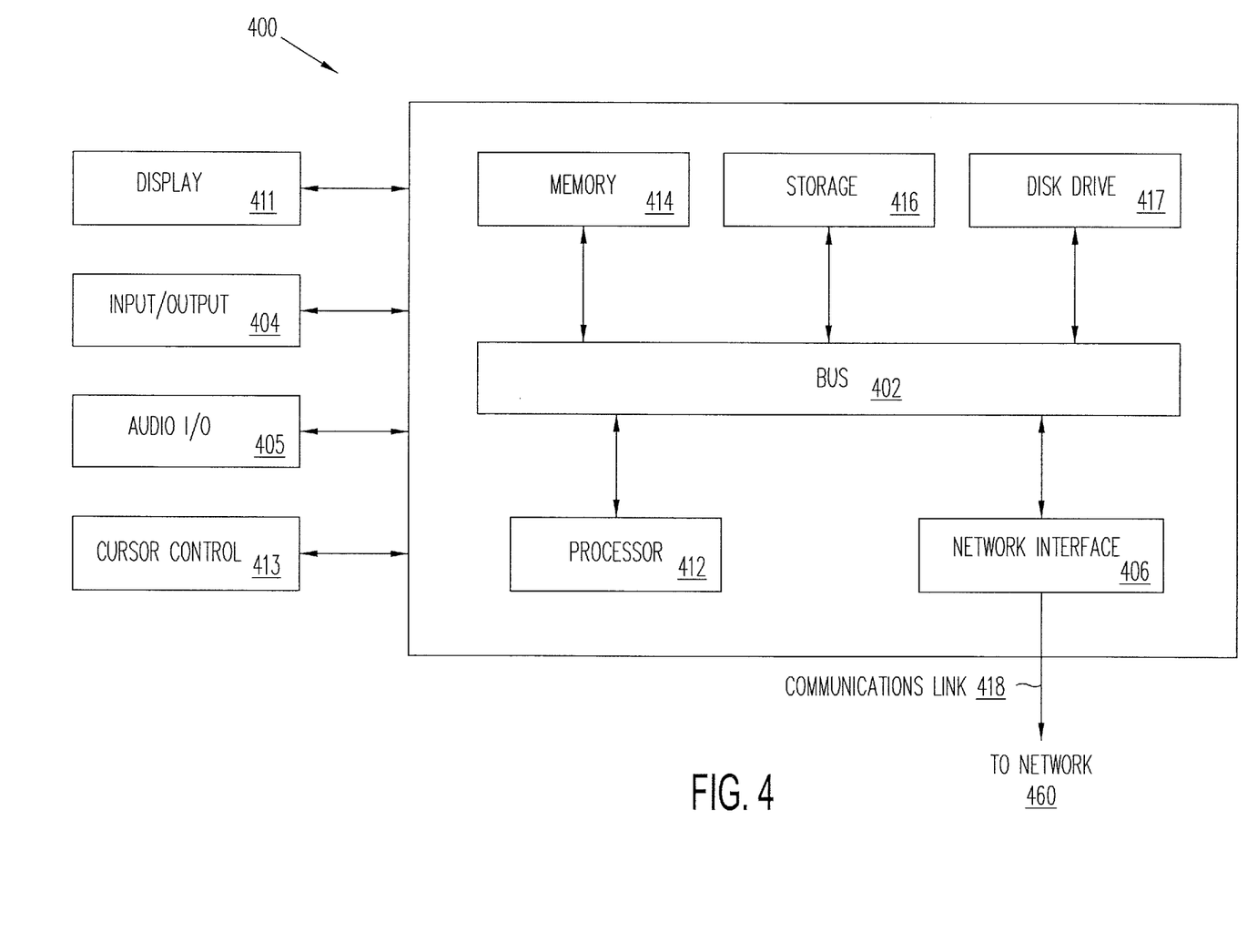
FIG. 4 is a block diagram of an example of a computer that is suitable for use in the system for electronic payment restriction, according to an embodiment.

FIG. 4 is a block diagram of a computer system 400 suitable for implementing one or more embodiments of the present disclosure. In various implementations, the PIN pad and/or merchant terminal may comprise a computing device (e.g., a personal computer, laptop, smart phone, tablet, PDA, Bluetooth device, etc.) capable of communicating with the network. The merchant and/or payment provider may utilize a network computing device (e.g., a network server) capable of communicating with the network. It should be appreciated that each of the devices utilized by users (such as children and parents), merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as a user device, a merchant server, or a payment provider server via network 460. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable and executable media include, for example, floppy disk, flexible disk, hard disk, magnetic tape, any other magnetic medium, CD-ROM, any other optical medium, punch cards, paper tape, any other physical medium with patterns of holes, RAM, ROM, E2PROM, FLASH-EPROM, any other memory chip or cartridge, carrier wave, or any other medium from which a computer is adapted to read.

In various embodiments, execution of instruction sequences for practicing the invention may be performed by a computer system. In various other embodiments, a plurality of computer systems coupled by a communication link (e.g., LAN, WLAN, PTSN, or various other wired or wireless networks) may perform instruction sequences to practice the invention in coordination with one another.

Modules described herein can be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa—for example, a virtual Secure Element (vSE) implementation or a logical hardware implementation.

Software, in accordance with the present disclosure, such as program code and/or data, may be stored on one or more computer readable and executable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

As used herein, the term "store" can include any business or place of business. The store can be a brick and mortar store or an online store. The store can be any person or entity that sells a product.

As used herein, the term "product" can include any item or service. Thus, the term "product" can refer to physical products, digital goods, services, or anything for which a user can make a payment, including charitable donations. A product can be anything that can be sold.

As used herein, the term "merchant" can include any seller of products. The term merchant can include a store. The products can be sold from a store or in any other manner.

As used herein, the term "mobile device" can include any portable electronic device that can facilitate data communications, such as via a cellular network and/or the Internet. Examples of mobile devices include cellular telephones, smart phones, tablet computers, and laptop computers.

As used herein, the term "parent" can include any person who has authority and/or capacity to make at least some decisions regarding another person. For example, the term "parent" can include an adult, a biological parent, a foster parent, a guardian, a custodian, an employer, a supervisor, or any other person (such as a person designated by a biological parent, a foster parent, a guardian, a custodian, an employer, or a supervisor).

As used herein, the term "child" can include any person who lacks authority and/or capacity to make at least some decisions regarding their self. For example, the term "child" can include a minor, a biological child, a foster child, a person who has a guardian, a person who has a custodian, an employee, someone who has a supervisor, or any other person who has a parent, as defined herein.

Thus, a parent can have the ability to restrict authorization of payments for purchases based upon the child's check in via a location-aware network, e.g., a social network. The payment can be an electronic payment, such as via a credit card, debit card, gift card, hardware security token, software security token, mobile device, or any other device. The payment can be a mobile payment, such as a payment made with or facilitated by a mobile device.

The foregoing disclosure is not intended to limit the present invention to the precise foul's or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claimed is:

1. A system comprising:
a non-transitory memory storing account information of a parent in a parent account, the account information including information regarding a child of the parent; and
one or more hardware processors configured to execute instructions to cause the system to perform operations comprising:
receiving an indication of a desire of the child to purchase a product from a merchant;
accessing the parent account;
determining from the parent account whether or not the child is authorized to purchase the product;
accessing a child's social network to determine whether the child has checked in with the merchant;
obtaining check-in information of the child, the check-in information of the child comprising a first location reported by a global positioning system (GPS) of a mobile device of the child and a first check-in time at the first location;
accessing a parent's social network to determine whether the parent has checked in with the merchant;
obtaining check-in information of the parent, the check-in information of the parent comprising a second location reported by a GPS of a mobile device of the parent and a second check-in time at the second location;
receiving, from the mobile device of the parent, boundaries of a geographical area defined by the parent; and
providing authorization for the child to purchase the product in response to: a determination that the child is authorized to purchase the product, the first location being within a predetermined distance from the second location, the first check-in time being within a predetermined time from the second check-in time, and the first location being within the boundaries of the geographical area defined by the parent.

2. The system of claim 1, wherein the child's social network and the parent's social network are different social networks.

3. The system of claim 1, wherein the providing authorization comprises authorizing the child to purchase the product only when the first location and the second location are the same.

4. The system of claim 1, wherein the child checks in with the merchant on the child's social network and the parent checks in with the merchant on the parent's social network via a near field communications (NFC) enabled mobile device.

5. The system of claim 1, wherein the geographical area is drawn by the parent on a map displayed on the mobile device of the parent.

6. The system of claim 5, wherein the geographical area is drawn via a touchscreen interface on which the map is displayed.

7. A method comprising:
detecting a first check-in of a child at a first merchant;
determining, at least in part via a global positioning system (GPS) on a mobile device of the child, a first location of the child at the first check-in and a first check-in time;
detecting a second check-in of a parent at a second merchant;
determining, at least in part via a GPS on a mobile device of the parent, a second location of the parent at the second check-in and a second check-in time;
receiving, from the mobile device of the parent, boundaries of a geographical area defined by the parent;
receiving, by one or more processors of a payment provider, a payment request from the child for a product offered by the first merchant;
verifying, by the one or more processors, that the child is authorized to purchase the product; and
processing, by the one or more processors, the purchase request based, in part, on whether the first location is within the boundaries of the geographical area defined by the parent, whether the first location is within a predetermined distance from the second location, and whether the first check-in time is within a predetermined time from the second check-in time.

8. The method of claim 7, further comprising determining that the child and the parent are at the same location when the child and the parent are checked in with two different merchants that are proximate to each other.

9. The method of claim 7, wherein verifying that the child is authorized to purchase the product comprises determining whether the purchase will cause an account balance limit or a credit limit to be exceeded.

10. The method of claim 7, wherein verifying that the child is authorized to purchase the product comprises evaluating an age of the child, when the purchase is made, an amount associated with purchases made by the child, or a combination thereof.

11. The method of claim 7, further comprising receiving updates regarding authorized purchases from the parent.

12. The method of claim 7, further comprising transmitting a notification to the parent of the purchase request.

13. The method of claim 7, wherein:
the detecting of the first check-in comprises accessing a first social network of the child to obtain information pertaining to the first check-in; and
the detecting of the second check-in comprises accessing a second social network of the parent to obtain information pertaining to the second check-in.

14. The method of claim 7, wherein the geographical area is drawn by the parent on a map displayed on the mobile device of the parent.

15. The method of claim 14, wherein the geographical area is drawn via a touchscreen interface on which the map is displayed.

16. A non-transitory machine-readable medium having stored thereon machine-readable instructions executable to cause a machine to perform operations comprising:
accessing a child's location-aware social network to determine whether the child has performed an electronic check-in;
obtaining check-in information of the child, the check-in information of the child comprising a first location reported by a global positioning system (GPS) of a mobile device of the child and a first check-in time at the first location;
accessing a parent's location-aware social network to determine whether the parent has performed an electronic check-in;
obtaining check-in information of the parent, the check-in information of the parent comprising a second location reported by a GPS of a mobile device of the parent and a second check-in time at the second location;
comparing the first location to the second location;

determining whether the child and the parent are proximate to each other based on the comparison;

determining whether the first check-in time is within a predetermined time of the second check-in time;

receiving an area defined by the parent via a map displayed on the mobile device of the parent;

receiving a payment request from a child for a product via the mobile device of the child;

verifying that the child is authorized to purchase the product; and processing the payment request based, in part, on whether the child and the parent are proximate to each other and on whether the first check-in time is within the predetermined time of the second check-in time, and wherein the processing is performed only in response to the first location being within the area defined by the parent.

17. The non-transitory machine-readable medium of claim 16, wherein the child's location-aware social network and the parent's location-aware social network are different social networks.

18. The non-transitory machine-readable medium of claim 16, wherein the child and the parent are determined to be proximate to each other when the first location is the same as the second location.

19. The non-transitory machine-readable medium of claim 16, wherein the respective check-in formation of the child and of the parent are each provided at least in part via a near field communications (NFC) enabled mobile device at a merchant where the product is offered.

20. The non-transitory machine-readable medium of claim 16, wherein determining whether the child and the parent are proximate to each other comprises determining whether the first location and the second location are within a predetermined distance from each other.

21. The non-transitory machine-readable medium of claim 16, wherein the area is defined by the parent drawing the area via a touchscreen user interface on which the map is displayed.

* * * * *